United States Patent [19]

Maron

[11] Patent Number: 5,207,413
[45] Date of Patent: May 4, 1993

[54] VACUUM SHEET FILM TRANSPORT AND METHOD

[76] Inventor: Stanislav Maron, 7801 N. 54th St., Paradise Valley, Ariz. 85253

[21] Appl. No.: 838,597
[22] Filed: Feb. 19, 1992
[51] Int. Cl.$^5$ .............................................. B65H 5/00
[52] U.S. Cl. .......................................... 271/5; 271/14; 271/103; 271/267; 354/182
[58] Field of Search ................. 271/3, 5, 14, 103, 107, 271/267, 194; 414/788.7, 797, 793; 354/180, 182; 355/312

[56] References Cited

U.S. PATENT DOCUMENTS

| | | | |
|---|---|---|---|
| 478,780 | 7/1892 | Bristol | 354/182 |
| 3,125,336 | 3/1964 | Wanielista | 271/3 |
| 3,584,868 | 6/1971 | Fromm et al. | 271/14 |
| 4,185,814 | 1/1980 | Buchmann et al. | 271/108 |
| 4,565,478 | 1/1986 | Ericsson | 414/793 |

FOREIGN PATENT DOCUMENTS 2527569 12/1983 France .............................. 271/194

OTHER PUBLICATIONS

Learned et al., Xerox Disclosure Journal, May, 1976, Vol. 1, No. 5, p. 5.

Primary Examiner—H. Grant Skaggs
Attorney, Agent, or Firm—Cahill, Sutton & Thomas

[57] ABSTRACT

A vacuum platen serially picks up a sheet of film from a stack of unexposed sheets of film, transports the sheet of film to a large format camera for exposure, retains the sheet of film planar during exposure, transports the sheet of film to a stack of exposed sheets of film and drops the sheet of film upon the stack of exposed sheets of film.

33 Claims, 4 Drawing Sheets

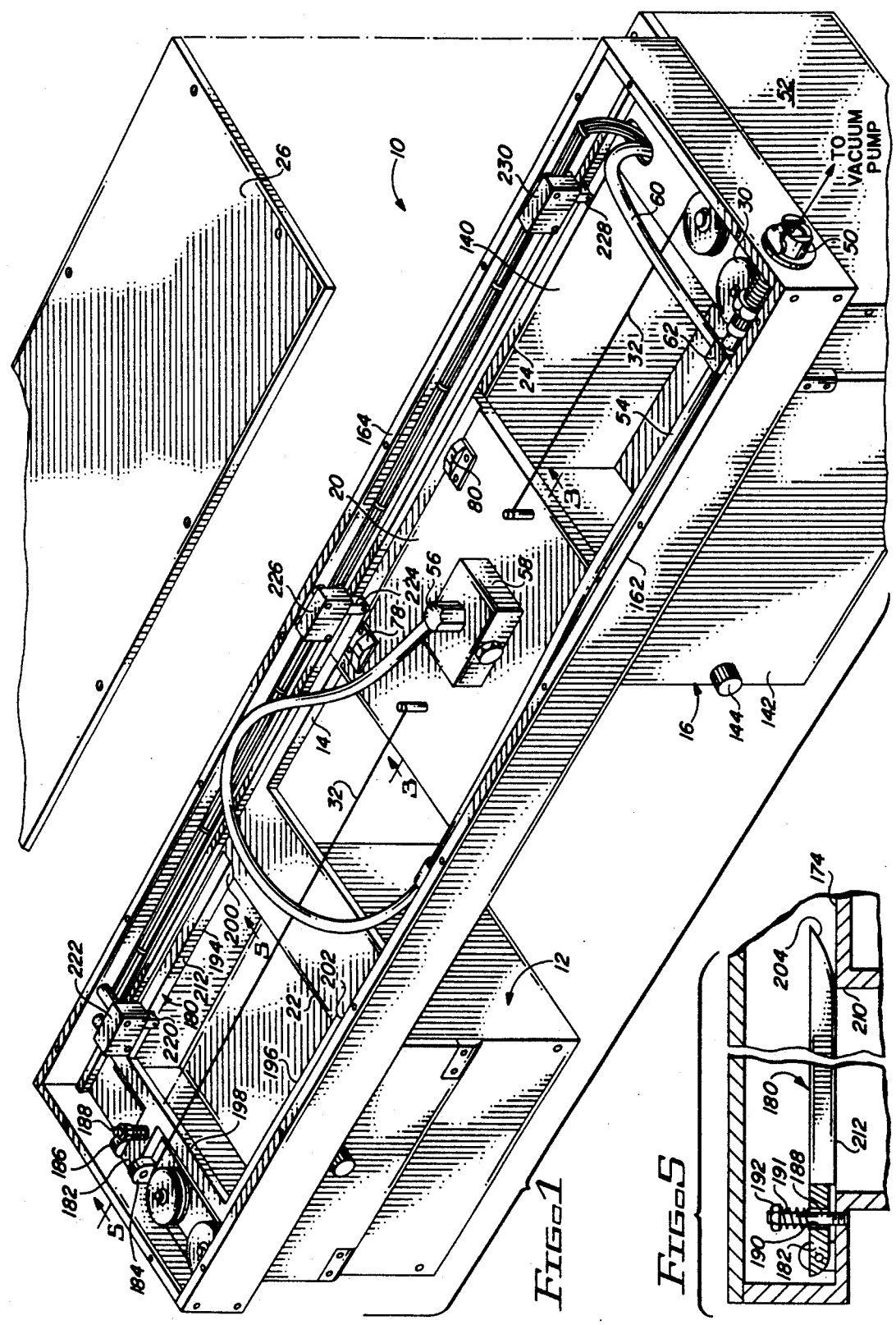

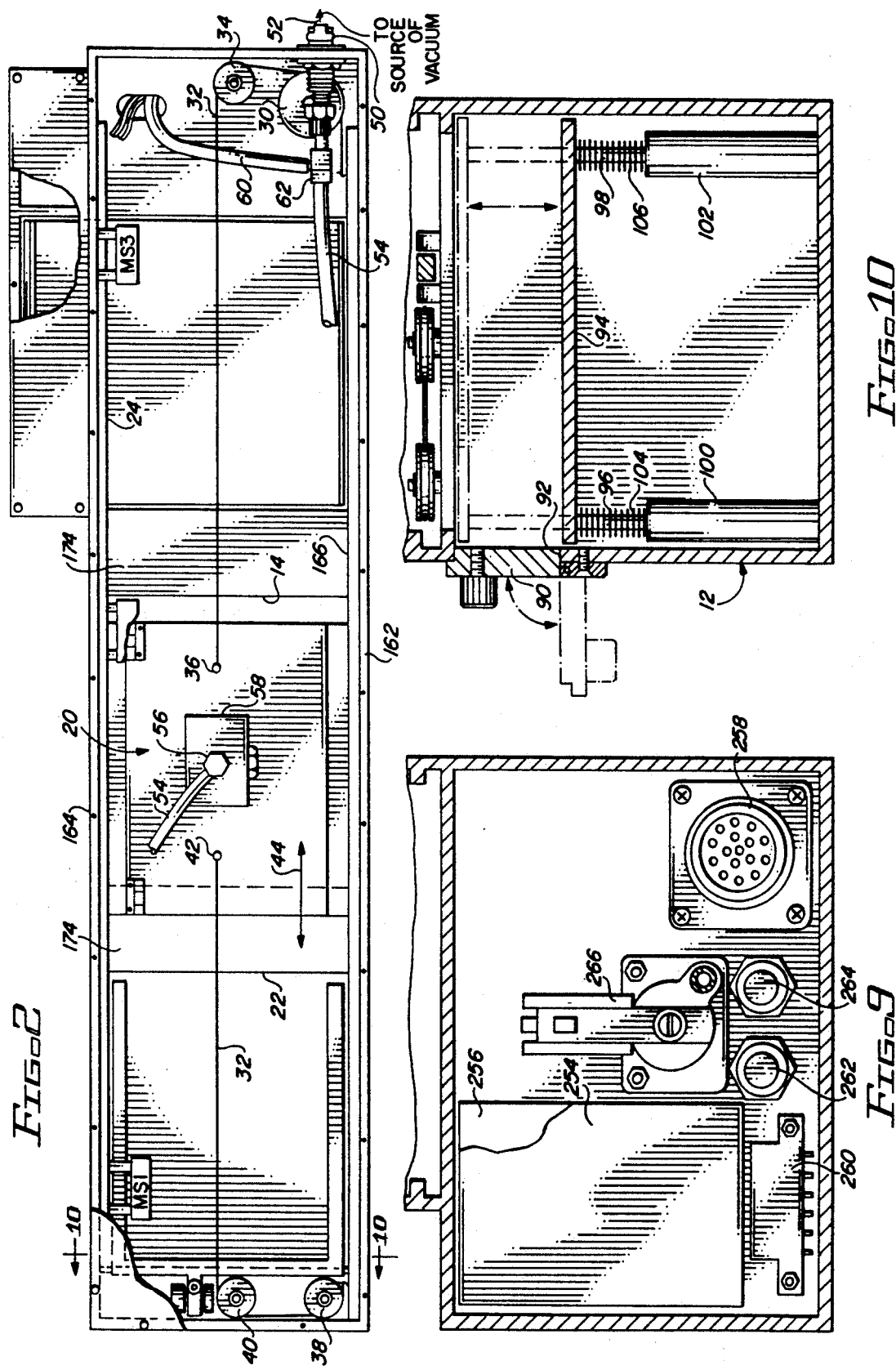

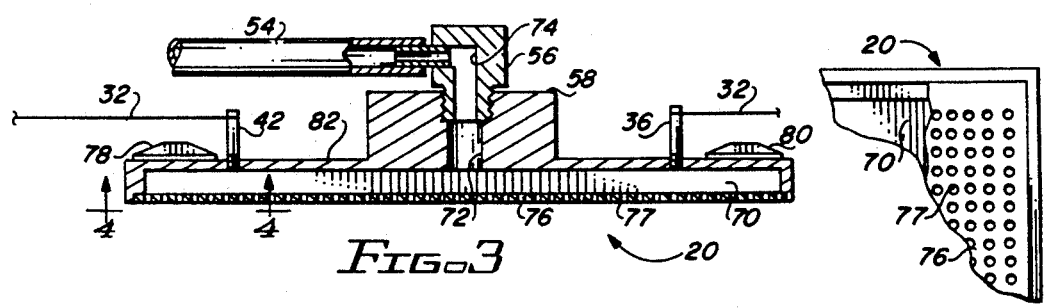
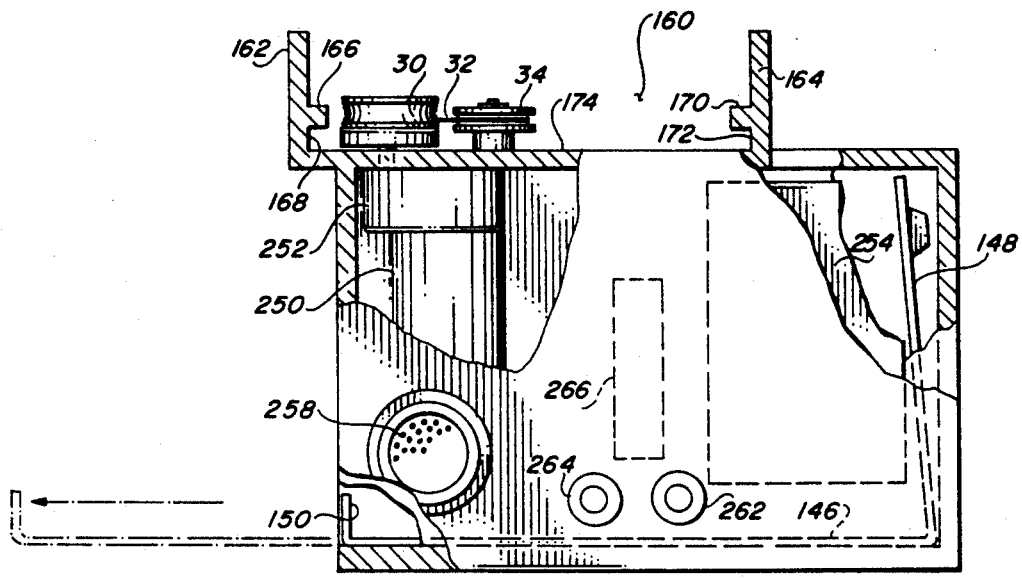
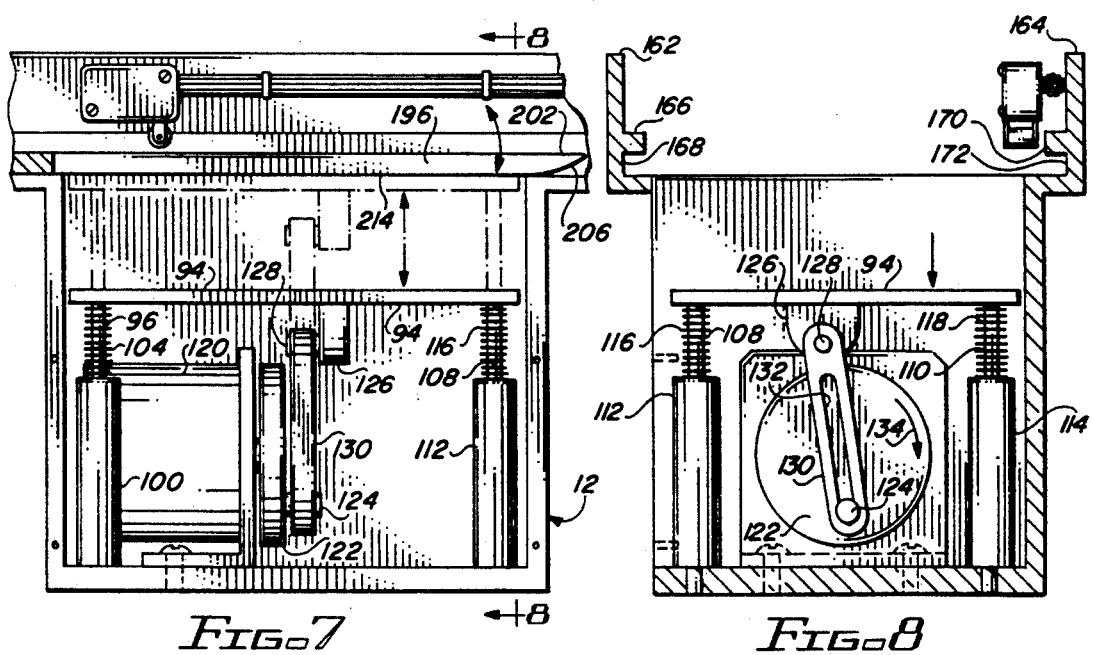

VACUUM SHEET FILM TRANSPORT AND METHOD

BACKGROUND OF THE INVENTION

1. Field of the Invention

The present invention relates to film transport mechanisms and, more particularly, to a translatable vacuum platen for transporting planar sheet film without scratching it.

2. Description of Related Art

In manual, semi-automated and automatic film transport systems relating to a large format camera, mechanical means transport the sheets of film used. The sheet film is gripped along one or more edges to effect transport. The process of engaging, transporting and releasing the sheet film presents a likelihood of and often does scratch the emulsion on the sheets of film. Where such transport includes exposure of the sheet film with a camera, it is not unusual to have the sheet film bowed or undulated during the moment of exposure. The extent and degree of non flatness of the sheet film during exposure affects the quality and accuracy of the image produced. Moreover, the extent to which the sheet film gripping elements intrude upon the sheet film itself is a function of a reduction of the exposable area of the sheet film.

SUMMARY OF THE INVENTION

A vertical stack of unexposed sheet film for use with a large format camera is serially lifted and removed by a vacuum platen disposed above the stack. Upon removal of a sheet of film, it is retained and transported by the vacuum platen to a location for exposure by a large format camera. During exposure, the vacuum acting upon the film causes ambient air pressure to flatten the film against the adjacent flat surface of the vacuum platen to ensure a planar configuration of the sheet of film during exposure. After exposure, the sheet film is transported to a stack of exposed sheets of film and dropped thereon as a result of withdrawal of the vacuum head acting upon the sheet film. This process precludes sheets of film from sliding along one another or along any other element and scratching of the sheets of film due to such activities cannot occur. The vacuum platen is thereafter transported to the stack of unexposed sheet film and the process is repeated. A plurality of limit switches, vacuum sensors and film presence sensors control continuing automated operation of the apparatus.

It is therefore a primary object of the present invention to provide a vacuum system for transporting sheet film to be exposed by a camera.

Another object of the present invention is to provide apparatus for serially transporting sheets of film from one stack to another without subjecting the sheets of film to the possibility of being scratched.

Another object of the present invention is to provide a vacuum head for retaining sheet film planar during exposure.

Yet another object of the present invention is to provide a continuously operating apparatus for serially exposing a stack of unexposed sheet film.

Still another object of the present invention is to provide a vacuum platen for serially picking up sheet film from a stack of unexposed sheet film, conveying the sheet film to a camera for exposure and depositing the exposed sheet film to form a stack of exposed sheet film.

A further object of the present invention is to provide an automated apparatus for serially exposing sheet film from a stack of unexposed sheet film.

A yet further object of the present invention is to provide apparatus for serially transporting unexposed sheet film from a stack, exposing the sheet film with a camera and stacking the exposed sheet film while accommodating replenishment of the stack of unexposed film and removal of the stack of exposed sheet film.

A still further object of the present invention is to provide a method for serially transporting unexposed sheet film from a stack with a vacuum platen, exposing the sheet film and stacking the exposed sheet film without subjecting the sheets of film to the possibility of being scratched.

These and other objects of the present invention will become apparent to those skilled in the art as the description herein proceeds.

BRIEF DESCRIPTION OF THE DRAWINGS

The present invention will be described with greater specificity and clarity with reference to the following drawings, in which:

FIG. 1 is a perspective view of apparatus for serially transporting sheets of film past a camera;

FIG. 2 is a top view of the apparatus illustrated in FIG. 1;

FIG. 3 is a cross-sectional view of a vacuum platen taken along lines 3—3, as shown in FIG. 1;

FIG. 4 is a partial plan view taken along lines 4—4, as shown in FIG. 3;

FIG. 5 is a partial cross-sectional view taken along lines 5—5, as shown in FIG. 1;

FIG. 6 is a partial end view of the exposed sheet film receiving end of the apparatus;

FIG. 7 is a partial cross-sectional view illustrating the sheet film loading mechanism;

FIG. 8 is a partial cross-sectional view taken along lines 8—8, as shown in FIG. 7;

FIG. 9 is an end view of the interior wall attendant the exposed sheet film stack;

FIG. 10 is a partial cross-sectional view taken along lines 10—10, as shown in FIG. 2;

DESCRIPTION OF THE PREFERRED EMBODIMENT

Figure 11:
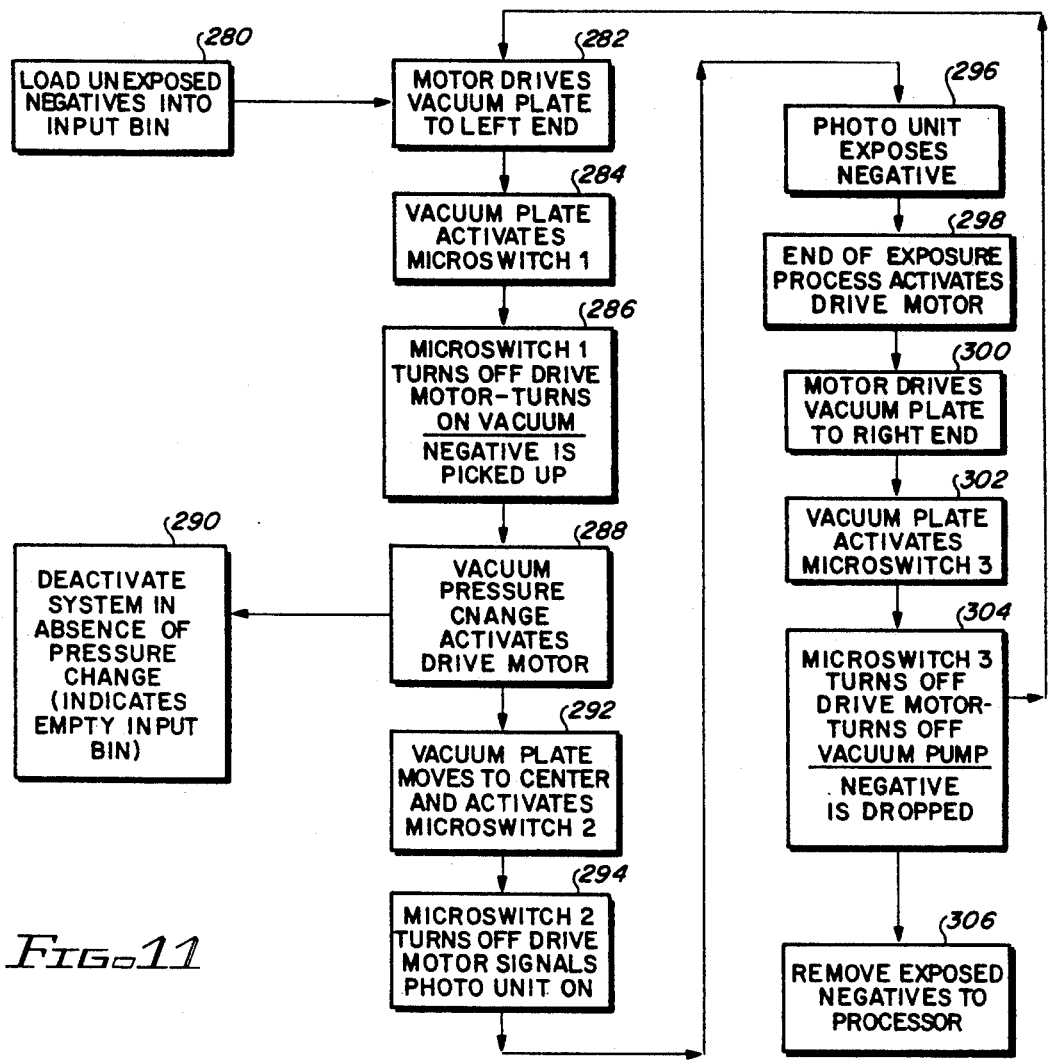
FIG. 11 is a block diagram describing the steps of the present invention.

Referring to FIG. 1, there is shown a film transport apparatus 10 for transporting sheet film from a feed bin 12, past an aperture 14 to a receiving bin 16. The film transporting element is a vacuum platen 20 slidably movable between aperture 22 in communication with feed bin 12, aperture 14, aperture 24 in communication with receiving bin 16 and return. Apertures 14 is sized to correspond with the sheet film retained by vacuum platen 20. Apertures 22 and 24 are preferably larger than the dimensions of the sheets of film to permit them to readily pass therethrough. A camera (not shown) is functionally associated with the film transport apparatus and disposed at least partly between feed bin 12 and receiving bin 16 to project an image upon a sheet of film disposed in corresponding relationship with aperture 14 to expose the sheet film upon operation of the camera.

A cover plate 26 is detachably attachable to the film transport apparatus to provide a light seal against intrusion of light into the interior of the film transport apparatus defining aperture 22, aperture 14, aperture 24 and housing vacuum platen 20 and its associated elements.

Referring jointly to FIGS. 1 and 2, transport of vacuum platen 20 will be described. A drive capstan 30 includes a cord 32 extending in one direction around an idler pulley 34 to post 36 extending from the vacuum platen. The cord also extends in the other direction to and around idler pulley 38 and idler pulley 40 to post 42 extending from vacuum platen 20. Upon rotary movement of drive capstan 30 in one direction or the other, the vacuum platen will be rectilinearly translated in a corresponding direction, as depicted by arrow 44. A fitting 50 is connectable to a source of vacuum 52, as depicted by the arrow, to provide a source of vacuum for the vacuum platen. A conduit 54 extends from fitting 50 to a right angle fitting 56 secured to a mounting block 58 of the vacuum platen. Since fitting 50 is fixed in position and fitting 56 translates with respect thereto, conduit 54 must be relatively flexible to prevent it from being an impediment to translation of vacuum platen 20. A further conduit 60 extends from a T-fitting 62. Conduit 60 is operatively secured to a pressure sensor (see FIGS. 6 and 7) to provide an indication of the presence or absence of a below ambient pressure or vacuum within conduit 54.

Referring particularly to FIGS. 3 and 4, further details of vacuum platen 20 will be described. The vacuum platen includes a plenum 70 in fluid communication with vacuum tube 54 through passageway 72 in mounting block 58 and passageway 74 extending through fitting 56. The top and sides of plenum 70 are impermeable for all practical purposes. Bottom panel 76 is apertured with a plurality of apertures 77 set in a relatively uniform pattern, as suggested in FIG. 4. Preferably, sufficient apertures should be disposed in bottom panel 76 to prevent any significant part of an adjacent sheet of film from not being forced against the bottom panel by ambient pressure due to a below ambient pressure environment within plenum 70. It is therefore evident that the number and arrangement of the apertures may vary as a function of the below ambient pressure within plenum 70, the stiffness of the sheet film and the smoothness of the surface of the bottom panel. Conventional 4×6 inch format sheet film work well is readily retained by the vacuum platen; furthermore, 8×11 inch format sheet film can also be retained and transported by a vacuum platen of the type described. Ramps 78,80 are disposed upon upper surface 82 of the vacuum platen for engagement by rollers of limit/position switches.

Feed bin 12 will be described with particularity with reference to FIGS. 1, 7, 8 and 10. The feed bin includes a hatch 90 pivotably openable, as depicted in phantoms lines in FIG. 10. This hatch exposes an opening 92 through which a stack of unexposed sheet film may be passed for placement within the feed bin. Closure of the hatch is necessary to ensure against transmission of light into the feed bin. A vertically moveable platform 94 is supported by rods 96, 98, 108 and 110 extendable from within receiving elements 100, 102, 112 and 114, respectively. Coil springs 104, 106, 116 and 118 are disposed about the rods and intermediate platform 94 and the receiving elements to urge the platform upwardly to its uppermost position, as depicted in phantom lines shown in FIGS. 10. Downward vertical movement is controlled by electric motor 120 having an armature mounted disc 122 supporting a spindle 124. A flange 126 depends from plate 94 and supports a pin 128. A bar 130 is in pivotable engagement with pin 128 and includes a slot 132 for receiving spindle 124. When motor 120 is energized, disc 122 will rotate, as depicted by arrow 134. Simultaneously, platform 94 will have been urged upwardly by the combined forces of coil springs 104, 106, 116 and 118. Such upward movement will cause the lower end of the slot in bar 130 to be brought up against spindle 124. This spindle prevents further upward movement of the bar and hence dictates the raised position of platform 94. When motor 120 is energized, disc 122 will rotate, as depicted by arrow 134. The rotation of the disc will cause spindle 124 to relocate to a lower position. The downward movement of the spindle, acting against the lower end of slot 132, will draw bar 130 downwardly and result in downward movement of platform 94. At the lowermost location of spindle 124, as depicted in FIG. 7, platform 94 will be at its lowermost position. At this position of the platform, feed bin 12 may be loaded with a stack of unexposed sheet film through aperture 92 after opening of hatch 90, as depicted in FIG. 10. Thereafter, motor 120 is energized to rotate disc 122 until spindle 124 is placed proximate its uppermost location. Subsequent upward movement of platform 94, due to removal of sheets of film, will be accommodated by slot 132 in bar 130 until spindle 124 engages the lower end of the slot. It is to be understood that motor 120 may be energized to lower platform 94 from any vertical position of the platform.

In the alternative, an air cylinder can be used to lower platform 94 in place of motor 120 and its associated elements. Appropriate solenoids or switches would be incorporated to provide the necessary pneumatic control functions. Moreover, the air cylinder or another air cylinder could be used to provide the upward bias in place of the coil springs shown in FIGS. 7 and 8.

As depicted in FIGS. 1, 2, 6 and 9, receiving bin 16 constitutes primarily a box 140 in communication with aperture 24 to receive exposed sheet film dropped therein through the aperture. Access to the feed bin is provided by a door 142 pivotally attached to the bin. A screw lock 144 or similar mechanism may be employed to retain the door closed. It is evident that access to the receiving bin may be undertaken at any time provided that appropriate darkroom procedures are in force to ensure against light contamination of the film. As particularly shown in FIG. 6, a tray 146 having an upwardly extending rear wall 148 may be placed within box 140 to receive the exposed sheets of film. A lip 150 disposed adjacent door 142 will assist in manually grasping the tray and drawing it through the door opening to permit access to the existing stack of exposed sheet film.

As is evident from various of the figures and as is particularly shown in FIGS. 1, 5, 6, 7, 8 and 10, vacuum platen 20 translates rectilinearly within a trough 160 defined by walls 162,164. A ledge 166 extending into the trough from wall 162 defines a channel 168, which channel receives one longitudinal edge of the vacuum platen. A further ledge 170 extends into the trough from wall 164 and defines a further channel 172, which channel receives the other longitudinal edge of the vacuum platen. It is to be understood that platform 174, defining the bottom of trough 160, defines in part a sidewall of each of channels 168,172. To provide smoothness of movement of vacuum platen 20, strips of low friction material, such as that sold under the trademark Teflon, may be disposed upon the bottom surfaces and along the opposed longitudinal edges of the vacuum platen. Other low friction elements or devices could also be employed. Thereby, the vacuum platen easily slides rectilinearly within trough 160 to transport sheets of film from the feed bin to the receiving bin.

Platform 94, supporting a stack of unexposed sheet film, will urge the sheet film upwardly through aperture 22 (see FIG. 1). As depicted in FIGS. 1, 2, 5 and 7, upward movement of the stack of sheet film past the plane defined by platform 174 must be restricted to prevent interference with movement of the vacuum platen. A pivotally attached fork 180 serves this purpose. The fork includes a base 182 pivotally secured intermediate ears 184,186 to accommodate the pivotal movement of the fork. A fixedly mounted stanchion 188 extends upwardly through aperture 190 is base 182. The relative dimensions of the stanchion and the aperture are such that pivotal movement of fork 180 is accommodated without binding between the stanchion and the aperture. A spring 191 may be secured at the upper end of the stanchion by a nut 192 engaging the stanchion. The spring bears against the upper surface of base 182 to urge fork 180 to its lowermost position and yet accommodate upward pivotal movement of the fork. To permit upward, essentially horizontal, movement of the fork, the pivot holes in ears 184,186 may be elongated.

Tines 194,196 extend from bar 198 formed as part of base 182. Forward ends 200,202 of the tines include lower upwardly sloping surfaces 204,206. These upwardly sloping surfaces bear against edge 210 of aperture 22 of the feed bin to permit bottom planar surfaces 212,214 to be in a plane slightly below the plane defined by platform 174. Thereby, the uppermost sheet film is at an elevation below that of platform 174 of trough 160. Upon translation of vacuum platen 20 toward the feed bin, the leading edge of the vacuum platen will bear against upwardly sloping surfaces 204,206 resulting in upward pivotal movement of fork 180 and the vacuum platen will pass thereunder. Because the front edge of the topmost sheet film is below the elevation of platform 174, the vacuum platen will slide thereover without contact with the sheet film as the vacuum platen advances to an overlapping relationship with the topmost sheet of film. To assist in ensuring no sliding contact between the vacuum platen and the sheet of film the rear ends of the tines bear against the sheet of film to hold it below the plane of platform 174.

Upon translation of the vacuum platen from aperture 22 and toward aperture 14, it will clear fork 180 and the fork will be pivotally lowered to once again bear against the top of the stack of sheet film. It is to be understood that indentations may be formed in platform 174 proximate edge 210 to accommodate tines 194,196 therein to maintain respective bottom surfaces 212,214 below the plane defined by platform 174.

Referring jointly to FIGS. 1, 2, 7 and 8, position indicating and limit switches associates with vacuum platen 20 will be described. As vacuum platen 20 is translated toward feed bin 12 and into overlapping relationship with aperture 22, ramp 78 will come in contact with roller arm 220 of switch 222. Upon such contact, the vacuum platen will be in the position for retrieving a film sheet. Accordingly, the signal generated will actuate apparatus to reduce the pressure (create a vacuum) within plenum 70 of vacuum platen 20. The creation of a vacuum within the plenum will result in attraction of the topmost sheet film to the vacuum platen as a result of the pressure differential on opposed sides of the topmost sheet film. The pressure differential will cause the topmost sheet of film to be raised to a location adjacent panel 76. Thereby, the top most sheet of film is lifted off the next sheet of film. Shortly thereafter, drive capstan 30 will be energized and cord 32 will be translated resulting in a force acting upon post 36 to draw the vacuum platen and the retained sheet of film toward aperture 14. When vacuum platen 20 is coincident with aperture 14, roller arm 224 will engage ramp 80 and switch 226 will generate a signal to stop operation of capstan drive 30. Further translation of vacuum platen 20 will cease.

Bowing of a sheet of film during exposure to an image will result in distortion of the image recorded on the sheet of film. By inspection of bottom panel 76 of vacuum platen 20, as shown in FIG. 4, a substantial number of apertures 77 are formed therein. Each of these apertures creates a location for an area of below ambient pressure proximate one side of the retained sheet of film. Ambient pressure, acting upon the other side of the sheet of film at corresponding locations, urges the respective areas of the sheet of film against the bottom panel. By having a substantial number of apertures 77, a substantial proportion of the area of the sheet of film is positively urged toward bottom panel 76 and little likelihood of any bowing or undulation of the sheet of film exists.

After the sheet film retained by the vacuum platen has been exposed by an associated camera (not shown), a signal will be generated by the camera to reactivate capstan drive 30. Upon such reactivation, vacuum platen 20 will be drawn toward aperture 24 of receiving bin 16. When the sheet film retained by the vacuum platen is coincident with aperture 24, roller arm 228 of switch 230 will be actuated and a signal will be generated. The signal generated will result in deactuation of capstan 30 and the means for maintaining a low pressure (vacuum) within plenum 70 of vacuum platen 20 will be de-energized. Accordingly, the force retaining the sheet film adjacent panel 76 of the vacuum platen will cease and the sheet film is free to drop through aperture 24 onto tray 146 in receiving bin 16. After a period of time, capstan drive is again actuated but in the opposite direction. Vacuum platen 20 will be urged by cord 32 to translate toward feed bin 12 until roller arm 220 once again engages ramp 78. During such translation, the means for creating a low pressure environment within plenum 70 of the vacuum plate will remain deactivated.

From the above description of the engagement, transport and release of the sheet of film, it will be evident that the sheet of film does not undergo any sliding movement. Without sliding movement, there is little likelihood of an event occurring which might scratch the emulsion on the film. Thus, the movement of the sheets of film by apparatus 10 will result in scratch free sheets of film.

Referring to FIG. 6, there is illustrated a drive motor 250 associated with a gear box 252 to cause rotation of drive capstan 30 in one direction or the other. Referring jointly to FIGS. 6 and 9, there is shown representative circuit boards 254,256 supporting various electronic components to perform the switching and signal generating functions necessary. An electrical plug 258 permits interconnection with a power source as well as with signal generating equipment associated with the camera to provide the requisite signal on completion of exposure of the sheet of unexposed film. A further plug(s) 260 may be employed to permit rapid replacement of one or more of the printed circuit boards. Fuse holders 262,264 provide protection of the electronic circuitry against overload due to malfunction or electrical shorting. A pressure switch 266, which may be associated with conduit 60, provides an indication of the presence or absence of low pressure (vacuum) within conduit 54. This low pressure switch provides a requisite signal to circuit boards 254,256 to perform the appropriate functions. The low pressure switch may also be used to sense the lack of change in pressure which would result if the vacuum platen did not retain a sheet of film from the feed bin. Such a signal would be tantamount to an indication that the feed bin was empty or that a malfunction existed.

Figure 12:
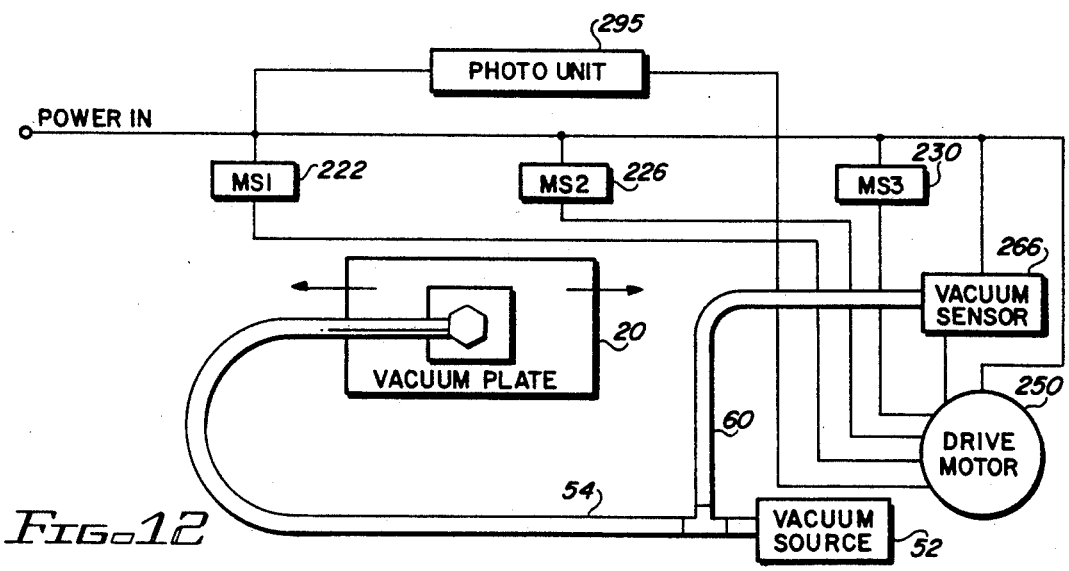
FIG. 12 is a schematic diagram illustrating the various operable systems attendant the present invention.

Referring jointly to FIGS. 11 and 12, the methodology of the present invention will be reviewed. To begin the process, block 280 suggests the loading of a stack of sheet film onto platform 94 through aperture 92 after the opening hatch 90. After loading, vacuum platen 20 is transported to a position coincident with the feed bin, as suggested by block 282. Upon positioning coincident with the aperture of the feed bin, switch 222 is activated which results in a low pressure environment within plenum 70 of vacuum platen 20, as depicted by blocks 284 and 286. When a sheet of film is adjacent bottom panel 76 of vacuum platen 20, the pressure within conduit 54 will change since air flow through apertures 77 in the bottom panel is restricted. This change in pressure is sensed by pressure switch 266 and a signal is generated to activate capstan drive 30, as suggested in block 288. In the event a pressure change does not result after a predetermined time period, it is likely that a malfunction has occurred in the feed of the stack of sheet film or the stack of sheet film is exhausted. In such event, all systems are deactivated and an alarm signal may be generated to indicate a malfunction, as depicted by block 290. In the event a change in pressure does occur signifying that sheet film has been retained by the vacuum platen, the vacuum platen is transported to a position coincident with aperture 14. At such location, switch 220 will be activated as suggested by block 292. Upon activation of switch 226, drive capstan 30 will be de-energized and a signal is generated to urge the camera or photo unit to expose the film disposed within aperture 14, as suggested by blocks 294,296. On completion of the exposure, the camera or photo unit will generate a signal resulting in actuation of capstan drive 30 and vacuum platen 20 will be transported to a position coincident with aperture 24 of receiving bin 16, as suggested by blocks 298,300. Upon such positioning of the vacuum platen, switch 230 will be actuated. This switch will generate a signal to deactivate capstan drive 30 and to relieve the reduced pressure within plenum 70 of vacuum platen 20, as suggested by blocks 302,304. Without a reduced pressure within plenum 70, the retaining force for the sheet of film will be absent and the film will drop onto tray 146. After one or more sheets of film have been placed upon tray 146, they may be removed by opening door 142 as set forth in block 306.

FIG. 12 specifically depicts the signal interconnections between various of the components of apparatus 10.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for transporting sheet film from a stack of unexposed sheet film past a location for exposing the sheet film and to a location for receiving the sheet film, said apparatus comprising in combination:
   a) a vacuum platen having a plenum and an apertured panel interconnecting said plenum with the ambient atmosphere;
   b) means for transporting said vacuum platen from a location in proximity to the stack of unexposed sheet film, to the location for exposing the sheet film, to the location for receiving the exposed sheet film and return;
   c) means for establishing a below ambient pressure environment within said plenum to draw a sheet of the sheet film off the stack of unexposed sheet film and against said panel and to retain the sheet of film against said panel during transport of said vacuum platen from the stack of unexposed sheet film, to the location for exposing the sheet film and to the location for receiving the exposed sheet of film; and
   d) a receiving bin disposed at the location for receiving the exposed sheet film; and
   e) means for depositing the exposed sheet of film in said receiving bin.

2. The apparatus as set forth in claim 1 wherein said panel is planar and including a sufficient number of apertures disposed in said panel to retain the sheet of film planar adjacent said panel during transport by said vacuum platen.

3. The apparatus as set forth in claim 1 including a source of below ambient pressure and means for interconnecting said source of below ambient pressure with said plenum to establish an air flow through the apertures of said panel into said plenum.

4. The apparatus as set forth in claim 1 wherein the location for exposing each sheet of film comprises an aperture and wherein said transporting means comprises means for positioning the sheet film to be exposed in juxtaposed relationship with said aperture.

5. The apparatus as set forth in claim 1 including means for sensing retention of a sheet of film by said vacuum platen and means for generating an enabling signal upon retention of the sheet of film.

6. The apparatus as set forth in claim 5 including means for enabling said transporting means in response to said enabling signal.

7. The apparatus as set forth in claim 6 wherein said depositing means comprises means for generating an output signal in response to transport of said vacuum platen to said receiving bin and means for disenabling said establishing means to terminate retention of the sheet of film by said vacuum platen.

8. The apparatus as set forth in claim 7 including means for producing a command signal in response to transport of said vacuum platen to the proximity of the stack of unexposed sheet film and means responsive to said command signal for energizing said establishing means.

9. Apparatus for transporting sheet film from a stack of unexposed sheet film past a location for exposing the sheet film and to a location for receiving the sheet film, said apparatus comprising in combination:

a) a vacuum platen having a plenum and an apertured panel interconnecting said plenum with the ambient atmosphere;

b) means for transporting said vacuum platen from a location in proximity to the stack of unexposed sheet film, to the location for exposing the sheet film, to the location for receiving the exposed sheet film and return;

c) means for urging the stack of unexposed sheet film upwardly and means for limiting the upward movement of the stack of unexposed sheet film to a position displaced from the plane of said panel when said vacuum platen is at the location in proximity to the stack of unexposed sheet film;

d) means for establishing a below ambient pressure environment within said plenum to draw a sheet of the sheet film off the stack of unexposed sheet film and against said panel and to retain the sheet of film against said panel during transport of said vacuum platen from the stack of unexposed sheet film to the location for exposing the sheet of film and to the location for receiving the exposed sheet of film;

e) a receiving bin disposed at the location for receiving the exposed sheet film; and f) means for depositing the exposed sheet of film in said receiving bin.

10. The apparatus as set forth in claim 9 wherein said limiting means accommodates translation of said vacuum platen adjacent the stack of sheet film.

11. Apparatus for transporting sheet film from a stack of unexposed sheet film past a location for exposing the sheet film and to a location for receiving the sheet film, said apparatus comprising in combination:

a) a vacuum platen having a plenum and an apertured panel interconnecting said plenum with the ambient atmosphere;

b) means for transporting said vacuum platen from a location in proximity to the stack of unexposed sheet film, to the location for exposing the sheet film, to the location for receiving the exposed sheet film and return, said transporting means including a capstan drive and a cord interconnecting said capstan drive with said vacuum platen;

c) means for establishing a below ambient pressure environment within said plenum to draw a sheet of the sheet film off the stack of unexposed sheet film and against said panel and to retain the sheet of film against said panel during transport of said vacuum platen from the stack of unexposed sheet film to the location for exposing the sheet of film and to the location for receiving the exposed sheet of film;

d) a receiving bin disposed at the location for receiving the exposed sheet film; and e) means for depositing the exposed sheet of film in said receiving bin.

12. Apparatus for transporting sheet film from a stack of unexposed sheet film past a location for exposing the sheet film and to a location for receiving the sheet film, said apparatus comprising in combination;

a) a vacuum platen having a plenum and an apertured panel interconnecting said plenum with the ambient atmosphere;

b) a feed bin for housing the stack of unexposed sheet film, an aperture for withdrawing the unexposed sheet film and a platform disposed in said feed bin for urging the stack of unexposed sheet film toward said aperture;

c) means for transporting said vacuum platen from a location in proximity to the stack of unexposed sheet film, to the location for exposing the sheet film, to the location for receiving the exposed sheet film and return;

d) means for establishing a below ambient pressure environment within said plenum to draw a sheet of the sheet film off the stack of unexposed sheet film and against said panel and to retain the sheet of film against said panel during transport of said vacuum platen from the stack of unexposed sheet film to the location for exposing the sheet film and to the location for receiving the exposed sheet of film;

e) a receiving bin disposed at the location for receiving the exposed sheet film; and f) means for depositing the exposed sheet of film in said receiving bin.

13. The apparatus as set forth in claim 12 including means for lowering said platform to accommodate loading said feed bin with sheet film.

14. The apparatus as set forth in claim 13 wherein said feed bin includes a hatch for providing access to the interior of said feed bin.

15. The apparatus as set forth in claim 13 wherein said receiving bin includes a tray disposed in said receiving bin for receiving the exposed sheet film deposited by said vacuum platen in said receiving bin.

16. Apparatus for serially transporting sheets of film to be exposed by a camera, said apparatus comprising in combination:

a) means for retrieving the topmost sheet of film from a stack of unexposed sheets of film, said retrieving means including means for establishing a below ambient pressure environment adjacent the top surface of the topmost sheet of unexposed film to create a force urging the topmost sheet of unexposed film adjacent to and retained by said retrieving means;

b) means for transporting said retrieving means and retained sheet of unexposed film from the stack of unexposed sheets of film to a first location for exposing the sheet of unexposed film with the camera and for transporting said retrieving means and retained exposed sheet of film to a second location for collecting the exposed sheets of film;

c) means for releasing the exposed sheet of film from said retrieving means at the second location; and d) means for relocating said retrieving means to the stack of unexposed sheets of film.

17. The apparatus as set forth in claim 16 including means for producing a command signal in response to said retrieving means being in proximity to the stack of unexposed sheets of film and means responsive to said command signal for energizing said establishing means.

18. The apparatus as set forth in claim 17 including means for sensing retention of a sheet of unexposed film by said retrieving means and means responsive to said sensing means for enabling said transporting means.

19. The apparatus as set forth in claim 17 including means for generating an output signal in response to relocation of said retrieving means to the second location and means for disabling said establishing means in response to said output signal.

20. The apparatus as set forth in claim 16 including an aperture disposed at the first location and associated with the camera for exposing each sheet of film transported to the first location and further including means for disabling said transporting means upon transport of a retained sheet of film to the first location.

21. The apparatus as set forth in claim 20 including means for enabling said transporting means on completion of exposure of a sheet of film through said aperture to transport said retrieving means to the second location.

22. The apparatus as set forth in claim 16 wherein said retrieving means includes means for urging planar retention of a retrieved sheet of film during exposure by the camera at the first location.

23. The apparatus as set forth in claim 22 wherein said urging means includes a multi-apertured planar panel.

24. The apparatus as set forth in claim 22 wherein said urging means is generally coincident with the adjacent surface of the retrieved sheet of film.

25. The apparatus as set forth in claim 16 wherein said transporting means includes electromechanical drive means.

26. A method for serially transporting sheets of film to be exposed by a camera, said method comprising the steps of:
  a) retrieving the topmost sheet of film from a stack of unexposed sheets of film, said step of retrieving including the step of establishing a below ambient pressure environment within a vacuum platen locatable adjacent the top surface of the topmost sheet of film to create a force urging retrieval of the topmost sheet of film;
  b) transporting the vacuum platen and the retrieved topmost sheet of unexposed film to a first location for exposing the sheet of film with the camera and transporting the vacuum platen and the exposed sheet of film to a second location for collecting the exposed sheets of film;
  c) releasing the exposed sheet of film at the second location;
  d) returning the vacuum platen to the stack of unexposed sheets of film; and
  e) repeating steps (a), (b), (c) and (d) until all of the sheets of film to be exposed have been exposed.

27. The method as set forth in claim 26 including a vacuum platen for carrying out said step of establishing and wherein said step of transporting includes the step of transporting the vacuum platen.

28. The method as set forth in claim 27 including the step of conveying the vacuum platen to the stack of sheets of film after exercise of said step of releasing.

29. The method as set forth in claim 28 including the step of inhibiting operation of said step of establishing during said step of releasing and during said step of conveying.

30. The method as set forth in claim 29 including the step of halting said step of transporting when the vacuum platen is at the first location and including the step of reinitiating operation of said step of transporting after exposure of the sheet of film by the camera.

31. Apparatus for transporting sheet film from a stack of unexposed sheet film past a location for exposing the sheet film and to a location for receiving the sheet film, said apparatus comprising in combination:
  a) a vacuum platen having a plenum and an apertured panel interconnecting said plenum with the ambient atmosphere;
  b) means for transporting said vacuum platen from a location in proximity to the stack of unexposed sheet film, to the location for exposing the sheet film, to the location for receiving the exposed sheet film and return;
  c) means for urging the stack of unexposed film upwardly;
  d) means for limiting the upward movement of the stack of unexposed sheet film to a position juxtaposed with the plane of said panel prior to said vacuum platen being returned to the location above the stack of unexposed sheet film;
  e) means for establishing a below ambient pressure environment within said plenum to draw a sheet of the sheet film off the stack of unexposed sheet film and against said panel and to retain the sheet of film against said panel during transport of said vacuum platen from the stack of unexposed sheet film to the location for exposing the sheet film and to the location for receiving the exposed sheet of film;
  f) a receiving bin disposed at the location for receiving the exposed sheet film; and
  g) means for depositing the exposed sheet of film in said receiving bin.

32. Apparatus for serially transporting sheets of film to be exposed by a camera, said apparatus comprising in combination:
  a) means for retrieving the topmost sheet of film from a stack of unexposed sheets of film, said retrieving means including means for establishing a below ambient pressure environment adjacent the top surface of the topmost sheet of unexposed film to create a force urging the topmost sheet of unexposed film adjacent said retrieving means, said retrieving means including means for urging the stack of unexposed film upwardly and means for limiting upward movement of the stack of exposed sheet film to a position displaced from the plane of said panel when said vacuum platen is being returned to the location in proximity to the stack of unexposed sheet film;
  b) means for transporting said retrieving means from the stack of unexposed sheets of film to a first location for exposing the sheet of unexposed film with the camera and for transporting the exposed sheet of film to a second location for collecting the exposed sheets of film;
  c) means for releasing the exposed sheet of film from said retrieving means at the second location; and
  d) means for relocating said retrieving means to the stack of unexposed sheets of film.

33. A method for serially transporting sheets of film to be exposed by a camera, said method comprising the steps of:
  a) retrieving the topmost sheet of film from a stack of unexposed sheets of film, said step of retrieving including the step of establishing a below ambient pressure environment within a vacuum platen locatable adjacent the top surface of the topmost sheet of film to create a force urging retrieval of the topmost sheet of film;
  b) urging the stack of unexposed film upwardly and limiting the upward movement of the stack of exposed sheet film to a position displaced from the plane of the vacuum platen when the vacuum platen is returned to a location adjacent the stack of unexposed film;
  c) transporting the vacuum platen and the retrieved topmost sheet of unexposed film to a first location for exposing the sheet of film with the camera and transporting the exposed sheet of film to a second location for collecting the exposed sheets of film;
  d) releasing the exposed sheet of film at the second location; and
  e) repeating steps (a), (b), (c) and (d) until all of the sheets of film to be exposed have been exposed.

* * * * *